United States Patent [19]

Munch

[11] 3,920,997
[45] Nov. 18, 1975

[54] APPARATUS FOR HOLDING FILM CASSETTES IN X-RAY MACHINES

[75] Inventor: Joseph Munch, Deurne, Belgium

[73] Assignee: Compagnie Generale de Radiologie, Paris, France

[22] Filed: Oct. 11, 1974

[21] Appl. No.: 514,084

[30] Foreign Application Priority Data
Oct. 12, 1973  Belgium ............................. 53140

[52] U.S. Cl. ............................... 250/468; 250/511
[51] Int. Cl.² .......................................... G03B 41/16
[58] Field of Search ............ 250/468, 511, 512, 513

[56] References Cited
UNITED STATES PATENTS
3,518,435  6/1970  Kok ..................................... 250/511
3,581,094  5/1971  Peyser................................. 250/511

Primary Examiner—Craig E. Church
Attorney, Agent, or Firm—Edwin E. Greigg

[57] ABSTRACT

An apparatus for holding film cassettes in an X-ray machine in the proper location and relative orientation for making an exposure. In particular, the distance of the top surface of the cassette, and, hence of the film held therein, from stationary parts of the X-ray machine is kept constant by a plurality of spring-loaded push buttons which press the film cassette against the overhanging edges of the arms which hold the cassette in place.

Each push button has a built-in electrical switch whose signal is used by a control mechanism for adjusting the size and position of the diaphragm of the X-ray machine to the particular length of the film cassette being loaded, while another electrical means related to the holding arms, controls the diaphragm in respect to the width of the cassette. The signals from the switches associated with the push buttons are also used to define the relative position of the cassette and the central beam of the X-ray tube.

5 Claims, 5 Drawing Figures

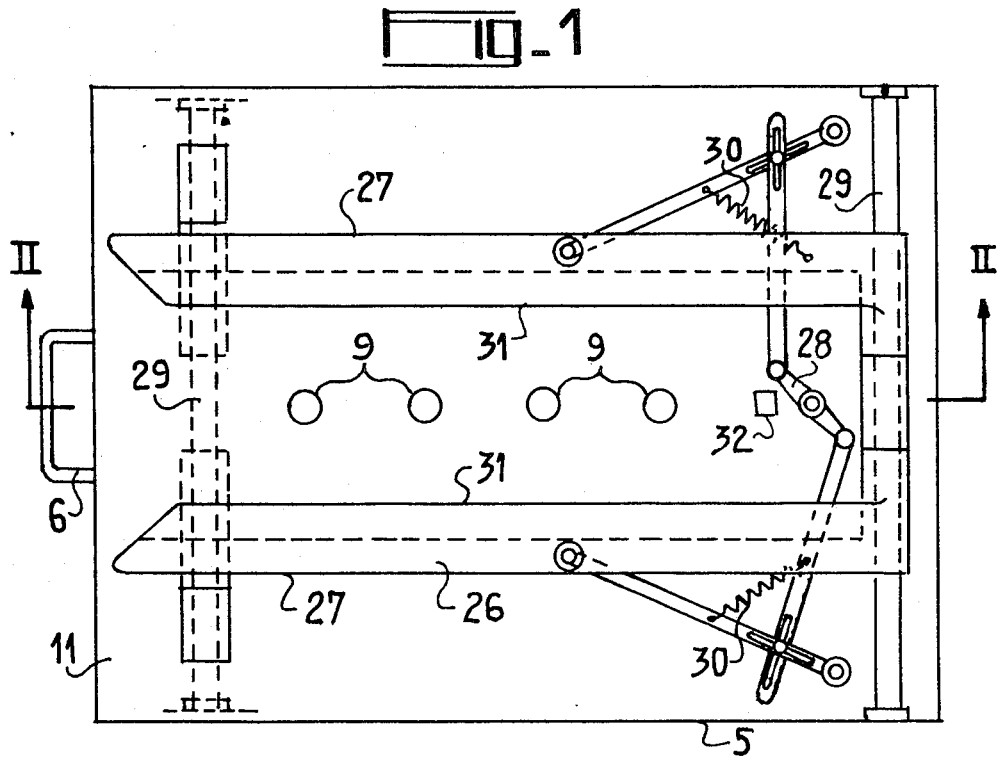
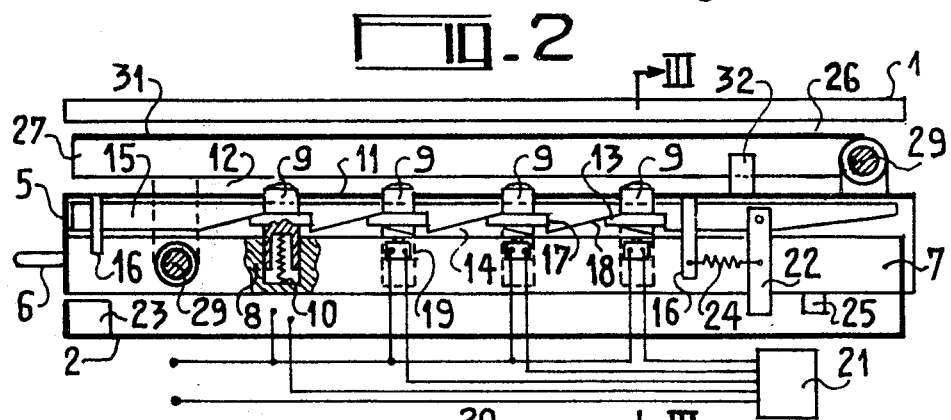
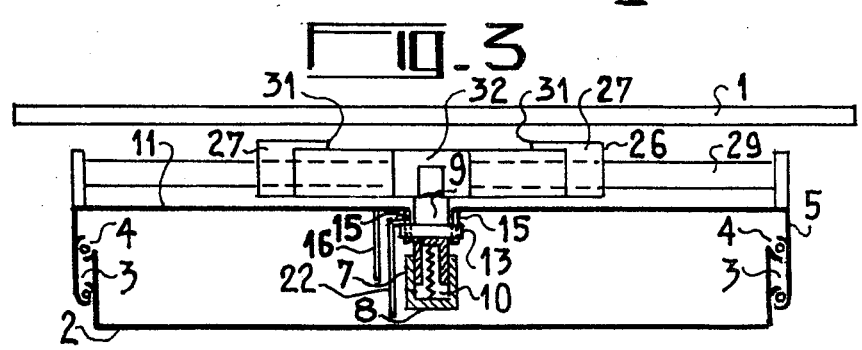

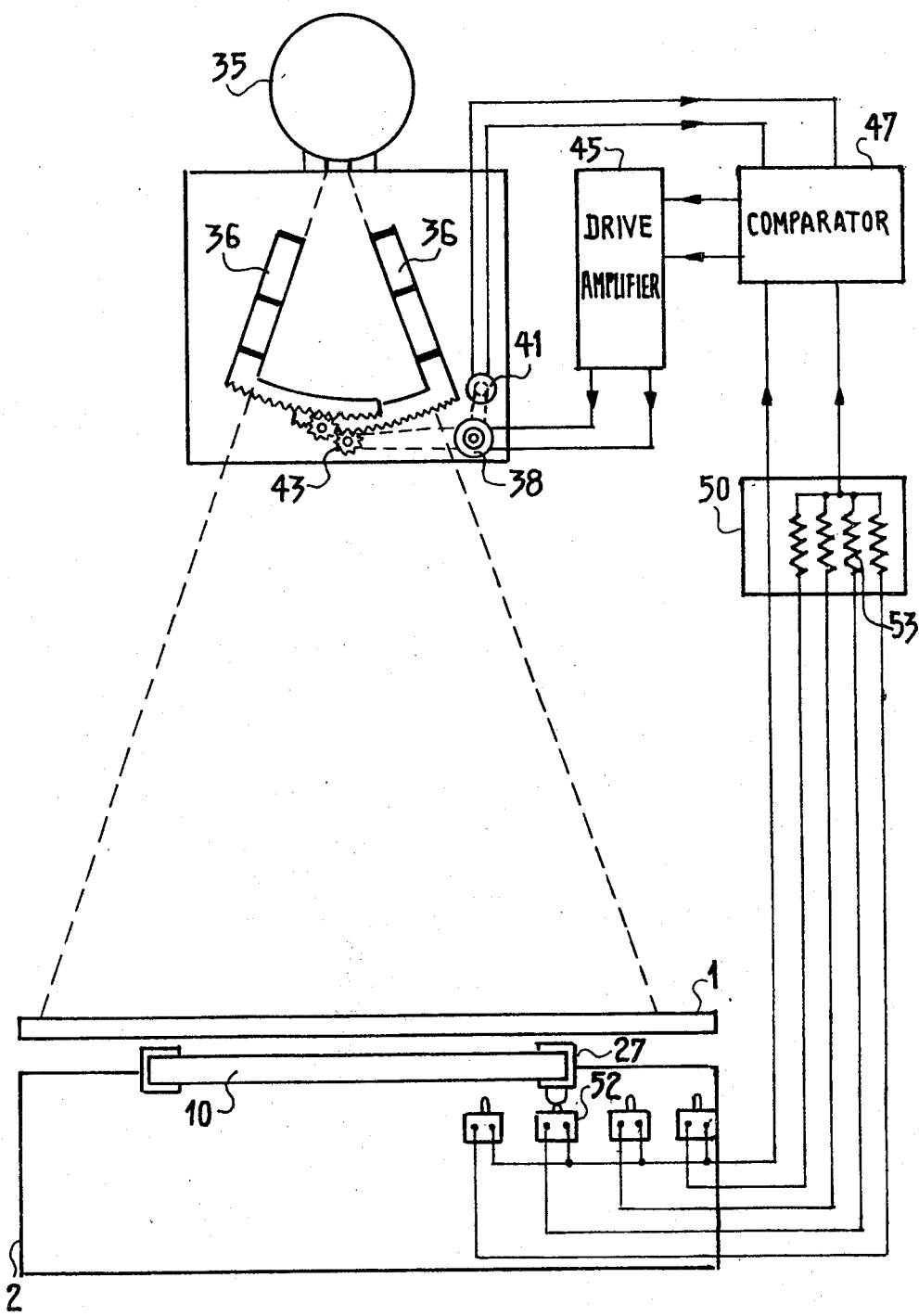

APPARATUS FOR HOLDING FILM CASSETTES IN X-RAY MACHINES

BACKGROUND OF THE INVENTION

The invention concerns an apparatus for mounting film cassettes of different sizes in an X-ray machine and to an X-ray apparatus adapted for their use.

Cassette-mounting devices are known which have a support plate located a certain distance below the anti-diffuser screen of the X-ray machine. Located between these two elements is a holding assembly including arms with overhanging edges which may spread apart for clamping a cassette. The arms cooperate with an element generating an electrical signal related to the width of the cassette for controlling the aperture of the diaphragm in the X-ray apparatus as a function of the width of the cassette. The support plate is provided with a fixed stop against which the cassette is placed.

OBJECT AND SUMMARY OF THE INVENTION

Using a known apparatus, it is not possible to attain the following objects which are, firstly, that the upper surface of a film cassette of any thickness placed in the X-ray machine should always be at the same fixed distance from the anti-diffuser screen so that exposures of good quality may be obtained and, secondly, to provide an apparatus in which, depending on the length of the cassette, the diaphragm of the X-ray apparatus is moved to the appropriate longitudinal position, and the central bundle of rays of the X-ray tube is directed toward the cassette.

These objects are attained, according to a principal characteristic of the invention, by providing an apparatus comprising several push buttons, installed seriatim in the support plane of the cassette, for the purpose of pushing the cassette up against the overhanging edge of the holding arms. Hence, the upper surface of the film cassette always lies at a constant distance from the anti-diffuser screen. In addition, each depressed push button actuates a switch which controls a mechanism to adjust the position of the diaphragm of the X-ray apparatus as a function of the length of the cassette and to adjust the central ray of the X-ray tube so as to be always directed toward the center of the cassette.

By way of a non-limiting example, a detailed description of a preferred embodiment of the apparatus according to the invention will be given with the aid of the accompanyind drawing.

BRIEF DESCRIPTION OF THE DRAWING

The drawing includes five figures.
FIG. 1 is a top view of the apparatus;
FIG. 2 is a longitudinal section through the apparatus along the line II—II in FIG. 1;
FIG. 3 is a transverse section of the apparatus along the line III—III in FIG. 2; and
FIGS. 4 and 5 are schematic views respectively illustrating the means for controlling the positions of the diaphragms in respect to the length and the width of the cassette.

DESCRIPTION OF THE PREFERRED EMBODIMENT

Figure 5:
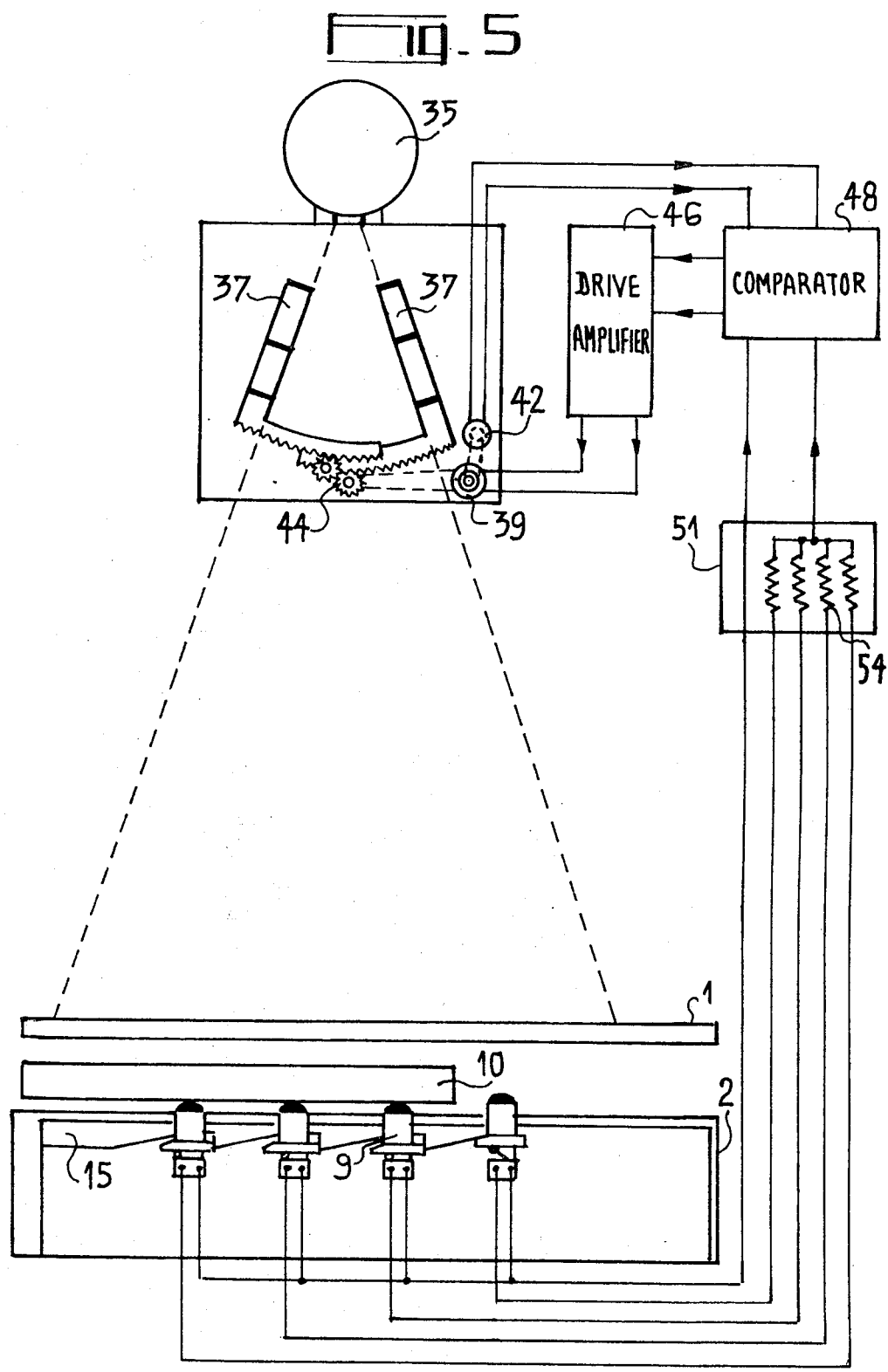

Turning now to the drawings, FIG. 2 shows best an apparatus comprising a fixed base 2 located beneath an anti-diffuser screen 1. Each of two opposite, lateral walls of this base 2 is equipped with a track 3 (FIG. 3) on which the gliders 4 of a slide drawer 5 are arranged to travel so that the slide drawer 5 with its top surface 11 may be moved with respect to the fixed base 2 by means of a handle 6 or, if desired, by a motor. Fixed inside the slide drawer 5 is a guide channel 7 with a plurality of cavities 8 which are located at fixed distances from one another. Within each cavity 8, there is provided a push button 9 which is urged upwardly by a compression spring 10. The top end of each push button emerges from an opening 12 formed in the surface 11. Each push button has a partially oblique collar 13 which cooperates with longitudinally aligned camways 14 in two pressure rails 15 disposed parallel to one another and capable of free movement guided by supporting guides 16 associated with the top surface of the slide drawer 5. Each of the pressure rails 15 has a vertical face 17 and an inclined cam face 18. The inclined faces 18 press on the collars of the push buttons 9 as the slide drawer 5 and the guide channel 7 are displaced with respect to the pressure rails 15. A switch 19 is installed underneath the collar of each push button 9. These switches 19 together control the circuits 20 of a control mechanism 21, which, by a suitable means not shown, regulates the longitudinal position of the diaphragm of the X-ray apparatus according to the length of the cassette disposed below the anti-diffuser screen 1. The switches 19 also provide that, irrespective of the length of the cassette, it is always located under the central bundle of rays of the X-ray tube. Both pressure rails 15 have a tab 22 which abuts a stop 23, fixed at the base 2, when the slide drawer 5 is in the pulled-out position. Disposed between the tabs 22 and the rear support guides 16 are two tensile springs 24 which always urge the vertical faces 17 of the rails 15 toward the collars 13 of the push buttons 9. The guide channel 7 has a tab 25 which also cooperates with the stop 23 to prevent pulling the slide drawer 5 completely out of the base 2. A clamping and holding mechanism 26 (FIG. 3) is installed on the top surface 11 of the slide drawer 5 for holding the film cassette in place. In the illustrated example, the clamping mechanism, which may be of any suitable type, has two arms 27—27 between which the cassette is held. A lever mechanism 28 and guide rods 29 cooperate to insure that the arms 27 are always displaced symmetrically and tensile springs 30 insure that the arms always hold the cassette firmly in a predetermined position. Each arm 27 has an overhanging top edge 31 against which the top surface of the cassette is pressed by the push buttons 9 so that, irrespective of the thickness of the cassette, its top surface and, hence, also the film contained in it, always lie at the same fixed distance from the anti-diffusing screen. A stop 32, affixed to the surface 11 of the slide drawer 5, insures that the front edge of any cassette always occupies the same place on the surface of the slide drawer.

A cassette of any particular size and thickness is accommodated between the arms of the clamping mechanism 26 of the X-ray machine in the following manner: the handle 6 is grasped and the slide drawer 5 is pulled from under the anti-diffuser screen 1. The clamping mechanism 26, mounted on the top of the slide drawer 5, and the guide channel 7 which is affixed thereto are also displaced, as are the switches 19 and the push buttons 9. The tensile springs 24, disposed between the tabs 22 and the support guides 16 affixed to the top surface of the slide drawer 5, pull along the pressure rails 15. After the tabs 22 abut the stop 23, the pressure rails 15, which are attached to the tabs 22, remain stationary, but the slide drawer 5 with the push buttons 9 may continue to move until the stop 25 on the guide channel 7 also abuts against the stop 23. Due to the relative displacement of the guide channel 7 and the push buttons 9 with respect to the pressure rails 15, the collar 13 of each push button 9 is forced to follow the inclined face 18 of the camways in the pressure rails 15, causing the push buttons 9 to be pushed downwardly into the guide channel 7. Thus, the free ends of all the push buttons 9 are finally located at the level of the surface 11 of the slide drawer 5. At this time, a cassette of a certain size is placed between the arms 27 and is pushed against the stop 32 on the surface of the slide drawer. Simultaneously with this operation, the arms spread apart but remain in contact with the cassette due to the force of the springs 30. When the slide drawer 5 is again pushed forward, the springs 24 pull the rails 15 back into their normal position with respect to the guide channel 7 and the push buttons 9. During the movement of the rails 15, the collar of each push button, urged upwardly by its spring 10, follows the inclined cam face 18 of the rails 15. Those push buttons on which the cassette does not rest, emerge from the guide channel 7 to their full extent whereas those push buttons 9 which are beneath part of the cassette emerge from the guide profile only far enough so that they press the cassette against the overhanging top edge 31 of the arms 27 as explained earlier herein. The slide drawer is now pushed further beneath the anti-diffusing screen. Those push buttons 9 which are compressed by the cassette each close their respective switches 19 which control the circuits for the control mechanism 21. By means which will be shown hereinbelow (FIG. 4) this control mechanism regulates the diaphragm of the X-ray apparatus in the longitudinal sense of the cassette, corresponding to its length, and it also acts to place the center of the cassette underneath the center bundle of rays of the X-ray tube.

FIGS. 4 and 5 respectively show the arrangement for controlling the positions of the diaphragms depending on the length and the width of the cassette.

The X-ray tube 35 emits an X-ray beam whose cross-section is limited in the direction of the length of the cassette 10 by a first diaphragm including a first pair shutters 36 (of FIG. 4) and in the direction of the width thereof by a second diaphragm including a second pair of shutters 37 (of FIG. 5) so as to substantially limit the exposure field to the dimensions of the cassette 10. The respective movements of these shutter pairs 36, 37 are respectively controlled by means of electric motors 38 (FIG. 4) and 39 (FIG. 5) through chains and gear transmissions 43 (FIG. 4) and 44 (FIG. 5). The electric motors 38, 39 further drive respective potentiometers 41 (FIG. 4) and 42 (FIG. 5) for signalling by means of a voltage the respective positions of the shutter pairs 36, 37. The motors 38, 39 are respectively fed from drive amplifiers 45 (FIG. 4) and 46 (FIG. 5), which receive respective error signals from comparators 47 (FIG. 4) and 48 (FIG. 5) of the differential amplifier type having two input ports. The comparators 47, 48 respectively compare the voltages or currents applied to their two input ports, the first one whereof being fed by the potentiometers 41, 42 and the second ones by two sets of resistors 50 (FIG. 4) and 51 (FIG. 5) connected thereto. Each set of resistors 50, 51 contains a plurality thereof having different values so that the one or ones selectively connected to the second input ports of the comparators 47, 48 as a function of the dimensions of the cassette 10 feed to this input port a voltage or current of a value substantially equal to that applied by the potentiometers 41, 42 to the first input ports, when the shutters 36, 37 are in a position to substantially limit the irradiated surface at the film plane to the dimensions of the cassette 10. If this is not the case, the difference between the signals respectively applied to the first and second input ports of the comparators 47, 48 and the polarity of the thus obtained difference or error signal are such that the motors 38, 39 are energized through the drive amplifiers 45, 46 to rotate the shafts of the potentiometers 41, 42 until they furnish substantially the same signal level as the set of resistors 50, 51, whereby the error signal is annulled and the motors 41, 42 stop.

In FIG. 4, showing the means for controlling the diaphragm position as a function of the cassette length, one of the arms 27 of the previously described clamping and holding mechanism (26, FIG. 3) is provided with a boss for pushing the push-buttons of a plurality of push-button actuated switches 52 disposed in a row, at respective locations corresponding to the lengths of different standard cassette formats. The switches 52 are respectively connected in such a way as to feed, when in their "make" position, one of the resistors 53 of the set, whose values are chosen in such a manner as to increase or decrease as a function of the position of the switch 52 to which they areccconnected.

If the switches 52 and the potentiometer 41 are fed from the same voltage supply, the motor 38 will be started when the switch 52 applies this d.c. voltage to the resistor 53 and stopped when the resistance of the potentiometer 41 reaches a value corresponding to that of resistor 53.

In a similar way, the means for controlling the diaphragm position as a function of the cassette width, shown in FIG. 5, includes a set of push-buttons 9 for actuating switches disposed in a row. The push-buttons 9 are pushed in by the lower face of cassette 10 itself and each one of the switches they respectively control feeds one of the resistors 54 of the set 51 with a d.c. voltage. However, as here all the push-buttons 9 beneath the cassette 10 remain pushed in a make contact in the switches they control, all the resistors 54 of the sets may have the same value so that the equivalent resistance they represent is equal to the ratio of this value to the number of push-buttons 9 actuated. The switches and push-buttons 9 are equidistant and the potentiometer 42 is connected so as to decrease its resistance with the increase of the spacing between the shutters 37—37 of the pair making up the diaphragm which controls the width of the X-ray beam. When a cassette 10 is placed inside the apparatus, it actuates a number of push-buttons 9 as function of its width. This in turn starts the motor 39, which rotates until the resistance of the potentiometer equals the value of resistor 54 divided by the number of push-buttons 9 pushed in by the cassette.

From the above description of the FIGS. 4 and 5 it can be seen that the diaphragms are respectively simultaneously controlled as functions of both dimensions of a cassette.

In an apparatus according to the invention, the top surface of the cassette and the film enclosed therein are always located at a given distance from the anti-diffuser screen 1, independently of the thickness of the cassette, so that satisfactory radiographic exposures may be made and the apparatus permits the use of cassettes of different sizes.

It is to be understood that the dimensions, the form and the relative position of the described elements could be different but would still remain within the framework of the invention while some of these elements could be replaced by others performing the same function.

What is claimed is:

1. An apparatus for holding film cassettes in X-ray machines including a plane surface, located at a predetermined distance from other elements of the X-ray machine, for example from the anti-diffusing screen, and, arranged on that plane surface, an assembly of gripper arms with overhanging edges for holding the film cassette for an X-ray exposure, and including means, actuated by said gripper arms or by their linkage mechanism, for generating an electrical signal to control the diaphragm of the X-ray machine according to the width of the film cassette, and further including a stop to define the position of the cassette on said plane surface, the improvement comprising:
   A. a plurality of push buttons, disposed in said plane surface, each push button including a spring urging said push button to emerge from said plane surface for pushing said film cassette against the overhanging edges of said gripper arms;
   B. electrical switches, there being one switch associated with and actuated by each of said push buttons; and
   C. a control mechanism for regulating the diaphragm of the X-ray machine, whereby the condition of said electrical switches is used by the control mechanism to control the diaphragm depending on the length of the particular film cassette located on said plane surface.

2. An improved apparatus for holding film cassettes, according to claim 1, the improvement further comprising a fixed base member, located beneath the anti-diffusing screen of the X-ray machine; and a slide drawer, disposed to glide on said base member, said plane surface which includes said push buttons being the top surface of said slide drawer.

3. An improved apparatus as defined in claim 2, the improvement further comprising a guide channel, affixed to claim 2, slide drawer and including said push buttons.

4. An improved apparatus as defined in claim 1, the improvement further comprising means, disposed between said slide drawer and said push buttons, for depressing said push buttons toward the interior of said slide drawer when said slide drawer is pulled out to the maximum extent relative to said fixed base.

5. An improved apparatus as defined in claim 4, wherein said means for depressing said push buttons include:
   i. at least one pressure rail, disposed between said slide drawer and said push buttons, capable of sliding motion and equipped with longitudinally aligned camways, each of which intersects a vertical face;
   ii. a tensile spring, disposed so as to urge said slide drawer and said pressure rail to approach each other;
   iii. a collar provided on each of said push buttons, each collar cooperating slidingly with the camway surface in said pressure rail;
   iv. a tab, affixed to said pressure rail; and
   v. a stop, affixed to said fixed base; whereby, while said slide drawer is moved relative to said fixed base, said tab makes contact with said stop, immobilizing said pressure rail with respect to said fixed base, so that continued motion of said slide drawer and the included push buttons relative to said fixed base will cause said pressure rail to urge said push buttons to move toward the interior of said slide drawer.

* * * * *